United States Patent
Mathur et al.

(10) Patent No.: US 10,719,374 B1
(45) Date of Patent: Jul. 21, 2020

(54) APPLICATION PROGRAMMING INTERFACE GENERATOR USING DATABASE METADATA

(71) Applicant: Capital One Services, LLC, McLean, VA (US)

(72) Inventors: Palak Mathur, McLean, VA (US); Jacques Morel, McLean, VA (US); Trent Jones, McLean, VA (US); Jordan Donais, McLean, VA (US); Maz Baig, McLean, VA (US); Ajmal Karuthakantakath, McLean, VA (US); Devi Kiran Gonuguntla, McLean, VA (US); Raghuram Madiraju, McLean, VA (US); Suresh Navayamkunnil Raghavan, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/573,166

(22) Filed: Sep. 17, 2019

(51) Int. Cl.
*G06F 9/54* (2006.01)
*G06F 16/25* (2019.01)

(52) U.S. Cl.
CPC .............. *G06F 9/54* (2013.01); *G06F 16/252* (2019.01); *G06F 16/258* (2019.01)

(58) Field of Classification Search
CPC ......... G06F 9/541; G06F 9/547; G06F 16/258
See application file for complete search history.

(56) References Cited

U.S. PATENT DOCUMENTS

| | | | | |
|---|---|---|---|---|
| 2010/0169351 | A1* | 7/2010 | Kulkarni | G06F 16/9554 707/759 |
| 2013/0151570 | A1* | 6/2013 | Sandoval | G06Q 30/02 707/803 |
| 2016/0019102 | A1* | 1/2016 | Cui | G06F 9/542 719/328 |

OTHER PUBLICATIONS

Danielsen et al., "Validation and Interactivity of Web API Documentation" (2013), IEEE 20th Conference on Web Services, pp. 523-530.*
Josuttis, N., "SOA in Practice" (2007), O'Reilly, pp. 1-324.*
Richardson et al., "RESTful Web Services" (2007), O'Reilly, pp. 1-419.*

* cited by examiner

*Primary Examiner* — Brian W Wathen
(74) *Attorney, Agent, or Firm* — Banner & Witcoff, Ltd.

(57) ABSTRACT

Aspects described herein may allow for the application of dynamically generating APIs using API generator based on database metadata. An API generator may extract metadata associated with store procedures. The API generator may generate a first layer of API that communicates with an enterprise application via a first data format. The API generator may generate a second layer of the API that communicates with a database via a second data format. The API generator may receive a request to invoke a stored procedure in a first data format. In response to receiving the request, the generated API may generate a converted request in the second data format.

18 Claims, 7 Drawing Sheets

APPLICATION PROGRAMMING INTERFACE GENERATOR USING DATABASE METADATA

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF USE

Aspects of the disclosure relate generally to cloud computing. More specifically, aspects of the disclosure may provide for facilitating communication between enterprise applications and database systems.

BACKGROUND

There are a large number of legacy enterprise applications that interact with databases directly via stored procedures. The stored procedures may have business logic crucial to the efficient operation of enterprise organizations. As enterprises in the cloud expand their services, migration of the legacy applications may impose challenges. Some systems attempt to address the issue by manually creating a proxy layer such as a representational state transfer (RESTful) application programming interface (API) for each stored procedure between the enterprise applications calling such store procedures and the corresponding databases. However, such migration approach may be time consuming and error-prone. In light of the limitations associated with the existing systems, there is a need for a mechanism to decouple the enterprise applications and the underlying databases with efficiency, accuracy and scalability.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

Aspects described herein may generally improve the accuracy, efficiency, and speed of communication between enterprise applications and databases via an API generator, which may dynamically generate an API proxies to facilitate the communication. The API generator may decouple the enterprise applications from the underlying databases, thus paving the way for future extraction of business logic and/or migration to a cloud-based environment.

Aspects described herein may allow for dynamically generating application programming interfaces (APIs) for facilitating communications between applications. These APIs may provide access to one or more stored procedures provided access to databases stored using one or more database management systems. Stored procedures are typically stored using the same database management system providing the database itself. The APIs decouple the business logic in the applications invoking the stored procedures from the underlying databases. The APIs may be generated based on metadata associated with a plurality of stored procedures in the database. The metadata may comprise a name, an input, and an output of the each of the plurality of the stored procedures. A first layer or function of APIs may be generated for each of the plurality of stored procedures, where the first layer or function is configured to communicate with a client via a first data format. A second layer or function of the API may be generated for the each of the plurality of stored procedures, where the second layer or function is configured to communicate with a database via a second data format. Upon receiving, from the client and via the first data format, a request to a stored procedure in the plurality of stored procedures; the API may generate a converted request in the second data format. According to some aspects, the API may send, via the second data format, the converted request to the database. In response to sending the converted request, the API may receive a response from the database, where the converted request executes the stored procedure in the database. The API may convert the response to the first data format, and the response may be sent to the client in the first data format.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

Figure 1:
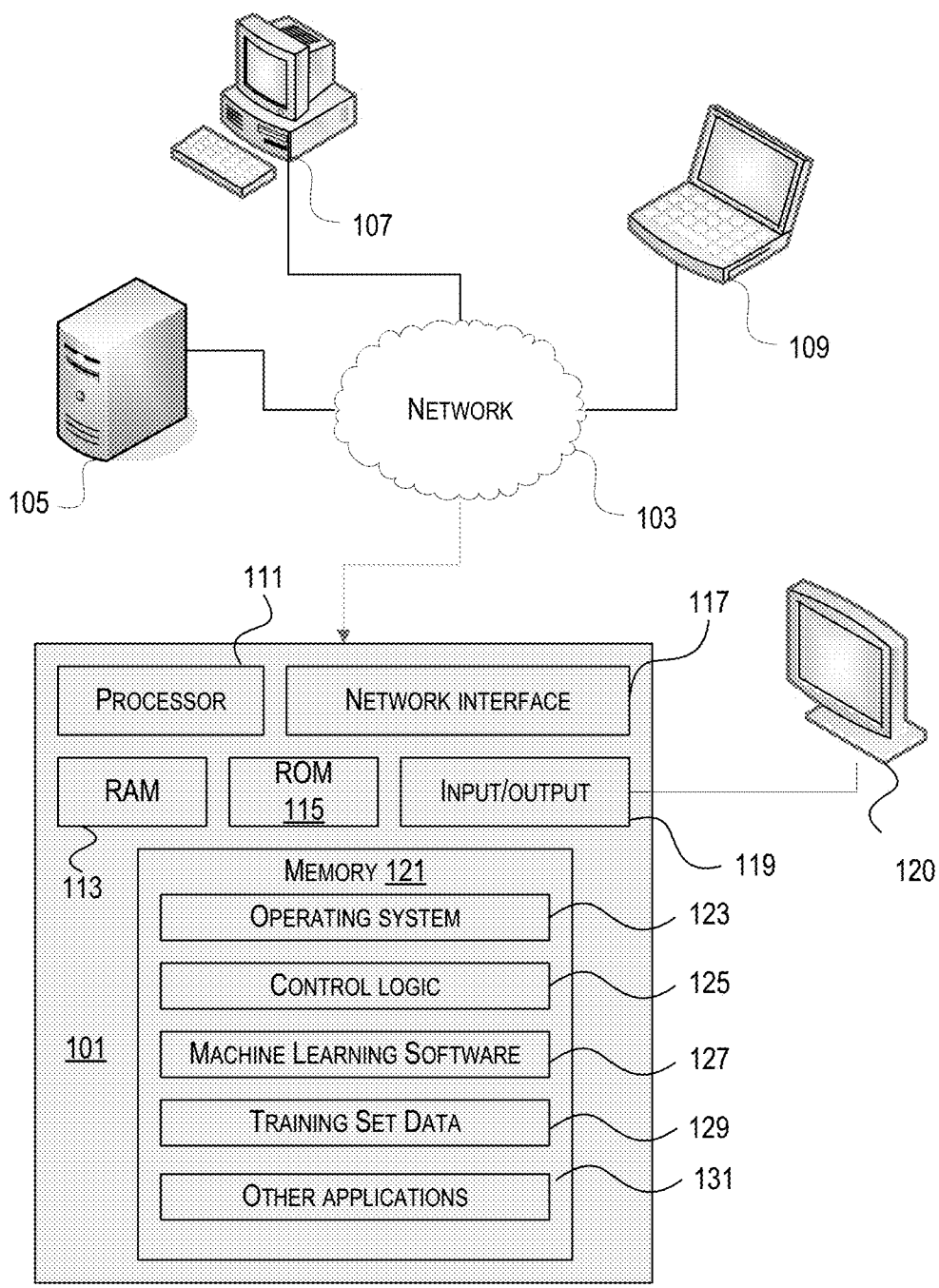
FIG. 1 depicts an example of a computing system that may be used in implementing one or more aspects of the disclosure in accordance with one or more illustrative aspects discussed herein.

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

Aspects described herein may allow for the application of dynamically generating APIs using API generator based on database metadata. An API generator may extract metadata associated with stored procedures in the databases. The API generator may generate a first layer or function of application programming interface (API) that communicates with an enterprise application via a first data format. The API generator may generate a second layer or function of the API that communicates with a database via a second data format. The API generator may receive a request to invoke a stored procedure in a first data format. In response to receiving the request, the generated API may generate a converted request in the second data format.

Aspects described herein may allow for the application of dynamically generating APIs using API generator based on database metadata. An API generator may extract metadata associated with stored procedures in the databases. The API generator may generate a first layer or function of application programming interface (API) that communicates with an enterprise application via a first data format. The API generator may generate a second layer or function of the API that communicates with a database via a second data format. The API generator may receive a request to invoke a stored procedure in a first data format. In response to receiving the request, the generated API may generate a converted request in the second data format.

According to some aspects, the API generator may dynamically generate the APIs using database metadata. Upon enterprise applications calling on the stored procedures, the APIs may facilitate the communications between the applications and the underlying databases.

According to some aspects, generating the first layer or function of the API may include generating a controller layer, where the controller layer communicates with the client in a first data format. Generating the second layer or function of the API may include generating a data access object (DAO) layer, where the DAO layer communicates with the database in a second data format. A data structure layer or function may also be generated, where the data structure layer comprises request parameters and response parameters of the API. A service layer or function may also be generated, where the service layer or function contains business logic associated with data access and transformation.

A plurality of APIs associated with the plurality of stored procedures may be generated. The plurality of APIs may be segmented into one or more domains. An assigned domain may be determined for the API, and the API associated with the stored procedure may be retrieved from the assigned domain. The API may comprise a representational state transfer (RESTful) API, which may use HTTP requests to GET, PUT, POST and DELETE data.

Aspects described herein may further allow for validating the first layer and the second layer of the API, prior to receiving the request to the stored procedure. The first and the second layer or function of the API may be regenerated when a change is made to a database schema, such as when there is a change to the structure of the database that defines the objects in the database.

Before discussing these concepts in greater detail, however, several examples of a computing device that may be used in implementing and/or otherwise providing various aspects of the disclosure will first be discussed with respect to FIG. 1.

FIG. 1 illustrates one example of a computing device 101 that may be used to implement one or more illustrative aspects discussed herein. For example, computing device 101 may, in some embodiments, implement one or more aspects of the disclosure by reading and/or executing instructions and performing one or more actions based on the instructions. In some embodiments, computing device 101 may represent, be incorporated in, and/or include various devices such as a desktop computer, a computer server, a mobile device (e.g., a laptop computer, a tablet computer, a smart phone, any other types of mobile computing devices, and the like), and/or any other type of data processing device. Any of the devices and systems described herein may be implemented, in whole or in part, using one or more computing systems described with respect to FIG. 2.

Computing device 101 may, in some embodiments, operate in a standalone environment. In others, computing device 101 may operate in a networked environment. As shown in FIG. 1, various network nodes 101, 105, 107, and 109 may be interconnected via a network 103, such as the Internet. Other networks may also or alternatively be used, including private intranets, corporate networks, LANs, wireless networks, personal networks (PAN), and the like. Network 103 is for illustration purposes and may be replaced with fewer or additional computer networks. A local area network (LAN) may have one or more of any known LAN topology and may use one or more of a variety of different protocols, such as Ethernet. Devices 101, 105, 107, 109 and other devices (not shown) may be connected to one or more of the networks via twisted pair wires, coaxial cable, fiber optics, radio waves or other communication media.

As seen in FIG. 1, computing device 101 may include a processor 111, RAM 113, ROM 115, network interface 117, input/output interfaces 119 (e.g., keyboard, mouse, display, printer, etc.), and memory 121. Processor 111 may include one or more computer processing units (CPUs), graphical processing units (GPUs), and/or other processing units such as a processor adapted to perform computations associated with machine learning. I/O 119 may include a variety of interface units and drives for reading, writing, displaying, and/or printing data or files. I/O 119 may be coupled with a display such as display 120. Memory 121 may store software for configuring computing device 101 into a special purpose computing device in order to perform one or more of the various functions discussed herein. Memory 121 may store operating system software 123 for controlling overall operation of computing device 101, control logic 125 for instructing computing device 101 to perform aspects discussed herein, machine learning software 127, training set data 189, and other applications 129. Control logic 125 may be incorporated in and may be a part of machine learning software 127. In other embodiments, computing device 101 may include two or more of any and/or all of these components (e.g., two or more processors, two or more memories, etc.) and/or other components and/or subsystems not illustrated here.

Devices 105, 107, 109 may have similar or different architecture as described with respect to computing device 101. Those of skill in the art will appreciate that the functionality of computing device 101 (or device 105, 107, 109) as described herein may be spread across multiple data processing devices, for example, to distribute processing load across multiple computers, to segregate transactions based on geographic location, user access level, quality of service (QoS), etc. For example, devices 101, 105, 107, 109, and others may operate in concert to provide parallel computing features in support of the operation of control logic 125 and/or software 127.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a data processing system, or a computer program product.

Figure 2:
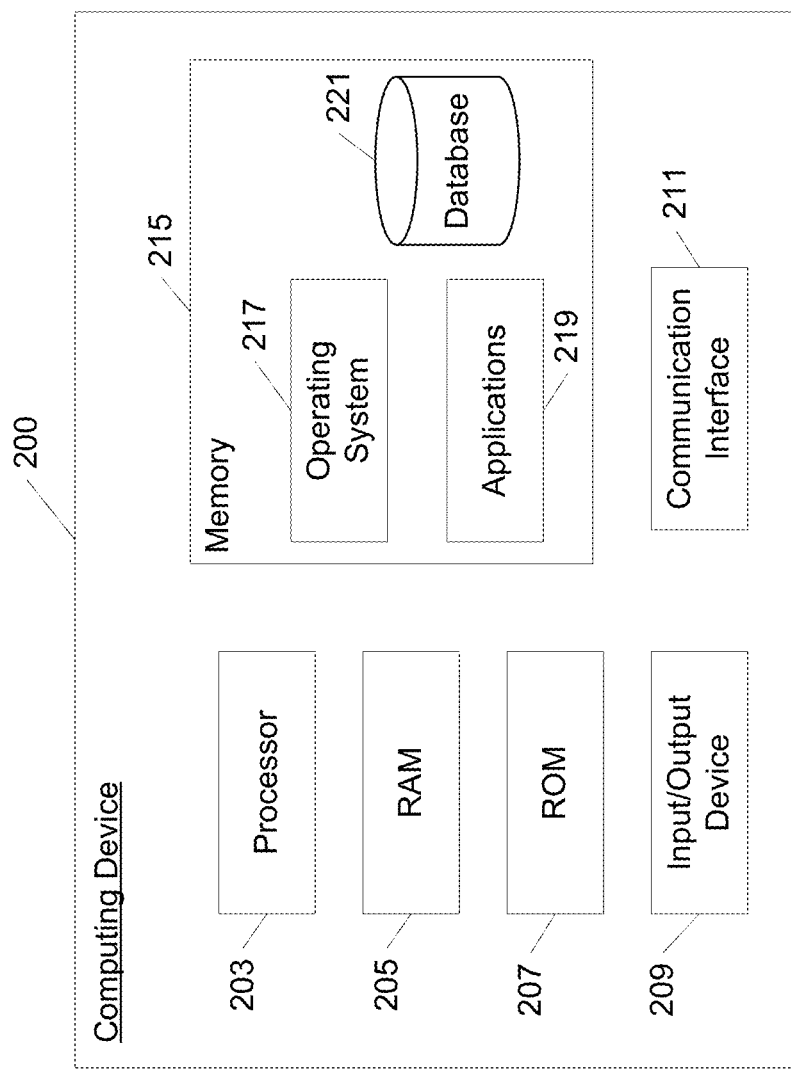
FIG. 2 shows an example computing device in accordance with one or more aspects described herein.

Turning now to FIG. 2, a computing device 200 that may be used with one or more of the computational systems is described. The computing device 200 may include a processor 203 for controlling overall operation of the computing device 200 and its associated components, including RAM 205, ROM 207, input/output device 209, communication interface 211, and/or memory 215. A data bus may interconnect processor(s) 203, RAM 205, ROM 207, memory 215, I/O device 209, and/or communication interface 211. In some embodiments, computing device 200 may represent, be incorporated in, and/or include various devices such as a desktop computer, a computer server, a mobile device, such as a laptop computer, a tablet computer, a smart phone, any other types of mobile computing devices, and the like, and/or any other type of data processing device.

Input/output (I/O) device 209 may include a microphone, keypad, touch screen, and/or stylus through which a user of the computing device 200 may provide input, and may also include one or more of a speaker for providing audio output and a video display device for providing textual, audiovisual, and/or graphical output. Software may be stored within memory 215 to provide instructions to processor 203 allowing computing device 200 to perform various actions. Memory 215 may store software used by the computing device 200, such as an operating system 217, application programs 219, and/or an associated internal database 221. The various hardware memory units in memory 215 may include volatile and nonvolatile, removable and non-removable media implemented in any method or technology for storage of information such as computer-readable instructions, data structures, program modules, or other data. Memory 215 may include one or more physical persistent memory devices and/or one or more non-persistent memory devices. Memory 215 may include, but is not limited to, random access memory (RAM) 205, read only memory (ROM) 207, electronically erasable programmable read only memory (EEPROM), flash memory or other memory technology, optical disk storage, magnetic cassettes, magnetic tape, magnetic disk storage or other magnetic storage devices, or any other medium that may be used to store the desired information and that may be accessed by processor 203.

Communication interface 211 may include one or more transceivers, digital signal processors, and/or additional circuitry and software for communicating via any network, wired or wireless, using any protocol as described herein.

Processor 203 may include a single central processing unit (CPU), which may be a single-core or multi-core processor, or may include multiple CPUs. Processor(s) 203 and associated components may allow the computing device 200 to execute a series of computer-readable instructions to perform some or all of the processes described herein. Although not shown in FIG. 2, various elements within memory 215 or other components in computing device 200, may include one or more caches including, but not limited to, CPU caches used by the processor 203, page caches used by the operating system 217, disk caches of a hard drive, and/or database caches used to cache content from database 221. For embodiments including a CPU cache, the CPU cache may be used by one or more processors 203 to reduce memory latency and access time. A processor 203 may retrieve data from or write data to the CPU cache rather than reading/writing to memory 215, which may improve the speed of these operations. In some examples, a database cache may be created in which certain data from a database 221 is cached in a separate smaller database in a memory separate from the database, such as in RAM 205 or on a separate computing device. For instance, in a multi-tiered application, a database cache on an application server may reduce data retrieval and data manipulation time by not needing to communicate over a network with a back-end database server. These types of caches and others may be included in various embodiments, and may provide potential advantages in certain implementations of devices, systems, and methods described herein, such as faster response times and less dependence on network conditions when transmitting and receiving data.

Although various components of computing device 200 are described separately, functionality of the various components may be combined and/or performed by a single component and/or multiple computing devices in communication without departing from the invention.

Figure 3A:
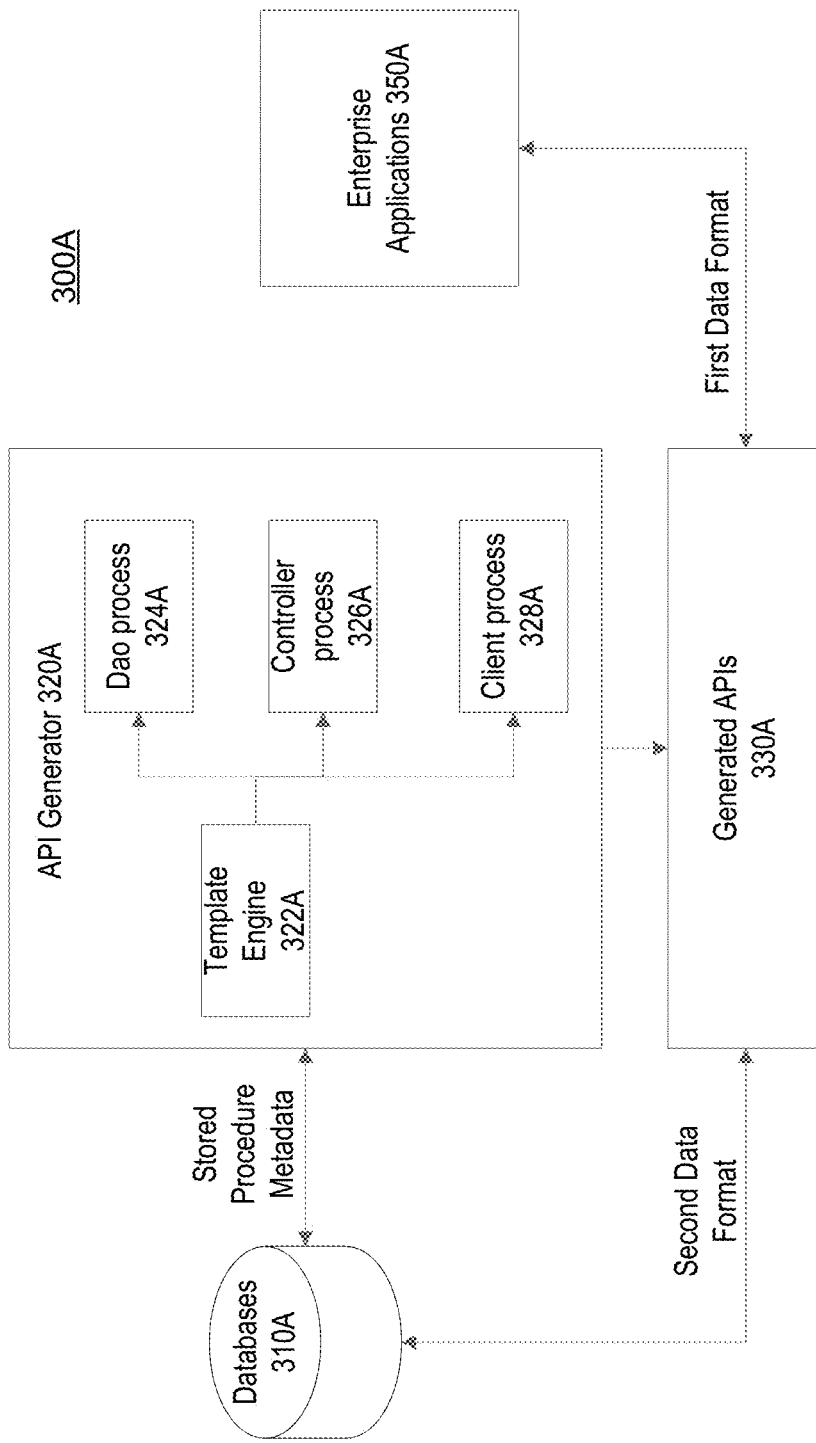
FIG. 3A depicts an example network architecture of an API generator according to one or more aspects of the disclosure.

FIG. 3A illustrates an example network architecture 300A of an API generator. System 300A may include databases 310A, API generator 320A, generated APIs 330A and enterprise applications 350A. Databases 310A, API generator 320A, and enterprise applications 350A may include one or more physical components, such as one or more processors, memories, communication interfaces, and/or the like.

As illustrated in FIG. 3A, API generator 320A may process the database metadata, such as a metadata table where each row in the table contain the source codes for the particular stored procedure. API generator 320A may generate layers or functions of an API. API generator 220 may dynamically generate an API to handle the request from enterprise applications 350A, and the generated API 330A may define a set of rules and mechanisms by which enterprise applications 350A and databases 310A may interact with each other. REST is a web standard based architecture where a REST server may provide access to resources and REST client may access and modify the resources. For example, API generator 320A may generate an API 330A, such as a RESTful API, and RESTful web services may use hypertext transfer protocol (HTTP) methods to implement the concept of REST architecture, define a Uniform Resource Identifier (URI) for a service, and provide resource representation such as JavaScript Object Notation (JSON), or XML, and a set of HTTP Methods. In the example of FIG. 3A, the RESTful API may act as a proxy layer that may communicate with enterprise applications 350A in a first data format, such as Java, and the RESTful API may communicate with databases 210 in a second data format such as Structured Query Language (SQL). In implementation, the request received from enterprise applications 350A and the request sent to databases 310A may conform to REST architectural styles, where the request received from enterprise applications 350A may include a first HTTP message and where the request sent to the databases 310A may include a second HTTP message.

API generator 320A may include a template engine 322A that may generate components of the RESTFUL API, such as processes 324A-328A, to facilitate the conversions between the first and second data formats and the communications between enterprise applications 350A and databases 310A. Data Access Object (DAO) process 324A may communicate with databases 310A using database technologies such as SQL queries, Object-Relational Mapping (ORM) or stored procedures etc. in a second data format, such as SQL. Controller process 326A may handle incoming HTTP requests and send response back to enterprise applications 350A using a first data format, such as Java, understandable to enterprise applications 350A. Client process 380A may generate client processes and code snippets that may be plugged into enterprise applications 350A. Template engine 322A may generate additional components (not shown in FIG. 3A), such as a service layer that may contain the business logic and orchestrate data access and transformation between various data formats and formats. Template engine 322A may generate additional data structures to interact with the rest components of the API and the data structures may include request and response parameters of the API.

Figure 3B:
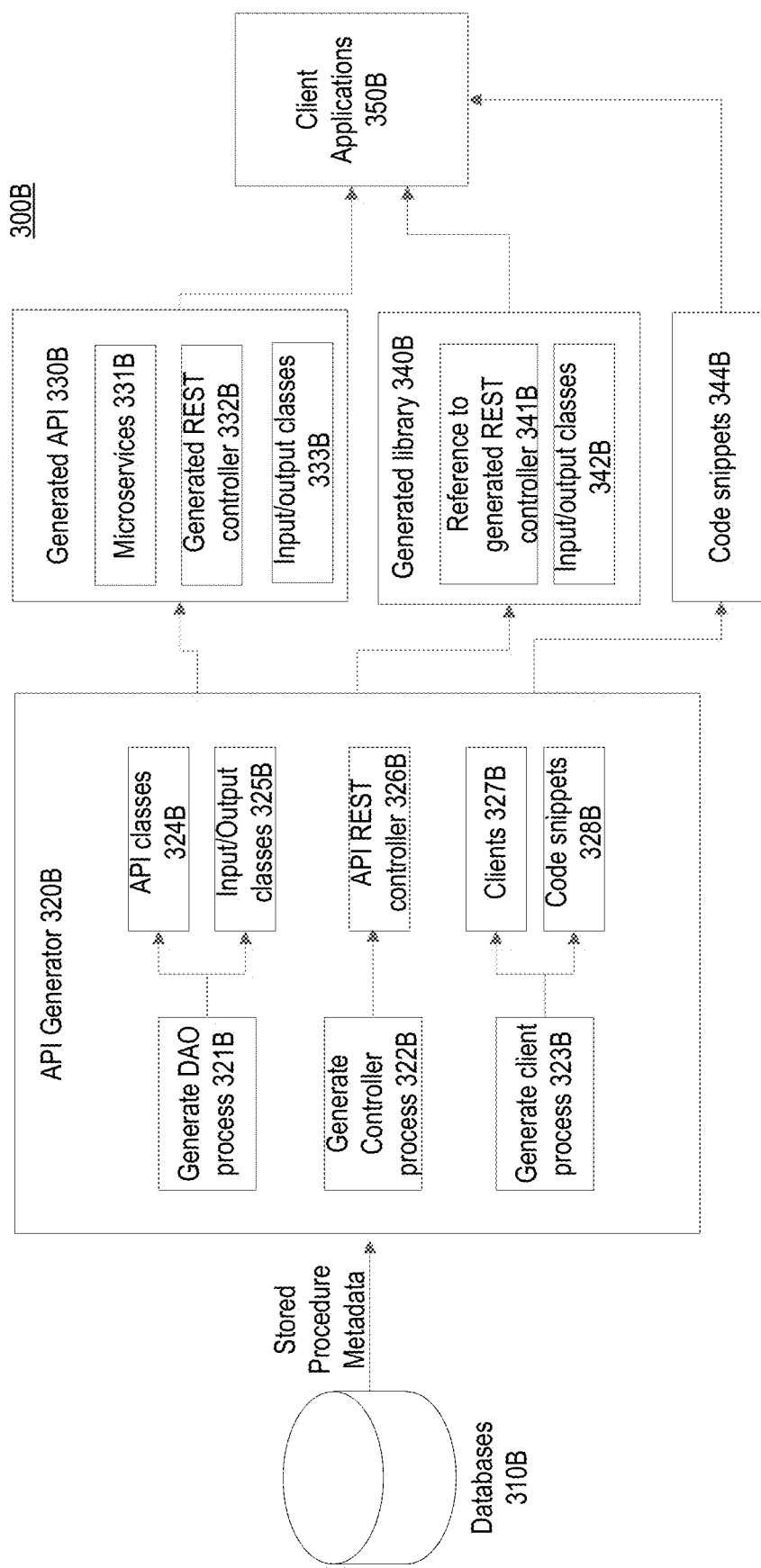
FIG. 3B depicts another example network architecture of an API generator according to one or more aspects of the disclosure.

FIG. 3B depicts another example network architecture of an API generator according to one or more aspects of the disclosure. FIG. 3B includes databases 310B, API generator 320B and client applications 350B. For API generator 320B to generate an API proxy, such as a RESTful API, the stored procedure metadata and parameters may be collected from database 310B. These parameters may be related to complex data types, and API generator 320 may query metadata tables of database 310B to obtain the information related to these complex data types. For example, API generator 320B may obtain metadata such as stored procedure names, stored procedure inputs and outputs in comma separated value (CSV) format from metadata table of databases 310B, parse the CSV data, use a template engine to generate API components such as DAO process 321B, controller process 322B and client process 323B. Once API generator 320B generates these API components, API generator 320B may validate each component or layer of the APIs and test the integrity of each API layer. The generated APIs 330B may match the complex data types extracted from databases 310B to the corresponding types in the client process for enterprise applications 350B, convert the database primitive types to the nearest, for example, Java types, and provide a mechanism to override the complex types for each of the stored procedure parameters.

DAO process 321B may communicate with databases 310B using database technologies such as SQL queries, Object-Relational Mapping (ORM) or stored procedures etc. in a data format understandable to databases 310B, such as SQL. DAO process 321B may generate API classes 324B and input/output classes 325B to facilitate communication with databases 310B via the second data format. Controller process 322B may generate an API controller such as an API REST controller 326B that may handle incoming HTTP requests and send responses back to enterprise applications 350B using a different data format, such as Java, which is understandable to enterprise applications 350B. Client process 280 may generate client processes 327B and code snippets 328B that may be plugged into enterprise applications 350B. API generator 320B may generate a service layer that may contain the business logic and orchestrate data access and transformation between various data formats and formats. API generator 320B may generate additional data structures to interact with the rest components of the API and the data structures may include request and response parameters of the API.

Through the coordination of processes 321B-323B, the service layer, and additional data structures, API generator 320B may generate a generated API 330B. Generated API 330B may include microservices 331B, generated REST controller 332B, and input/out classes 333B. Microservices 331B may be an open source rapid application development platform that allows a large systems to be built up from a number of collaborating components and microservices. Microservices 331B may be implemented using a variety of open-source libraries, such as the Spring Framework, and microservices 331B may include a microservice manager to manage the processes. For example, an on-line shopping service may include the collaboration from microservices such as an account service, a product catalog, a shopping cart service and an order processing service. Microservices 331B may handle various tasks such as service registration, creation of the microservices, configuration options, accessing the microservices and encapsulation, and loggings. Generated REST controller 332B may handle incoming HTTP requests and send responses back to enterprise applications 350B in a communication data format understandable to enterprise applications 350B. Input/output classes 333B may be used for reading/writing byte streams, reconstructing the database primitive data types and converting data from the database primitive data types associated with databases 310B.

API generator 320B may generate a generated library 340B that may include reference to generated REST controller 341B and input/output classes 342B. Through the interaction with generated REST controller 332B, the reference to generated REST controller 341B may affiliate the communications with enterprise applications 350 for the requests and response, while using input/output classes 333B for reading/writing byte streams, reconstructing the application primitive data types and converting data from the application primitive data types associated with enterprise applications 350B.

API generator 320B may generate code snippets 344B which may be a small collection of re-usable source code, machine code, or text that may be defined as operative units to incorporate into larger programming modules such as enterprise applications 350B. Code snippets 344B may be written in a data format understandable to enterprise applications 350B or a language that is specific to the applications 350B in which the language is hosted.

Enterprise applications 350B may communicate with the underlying databases 310B via the interactions with generated API 330B, generated library 340B and code snippets 344B.

Figure 4:
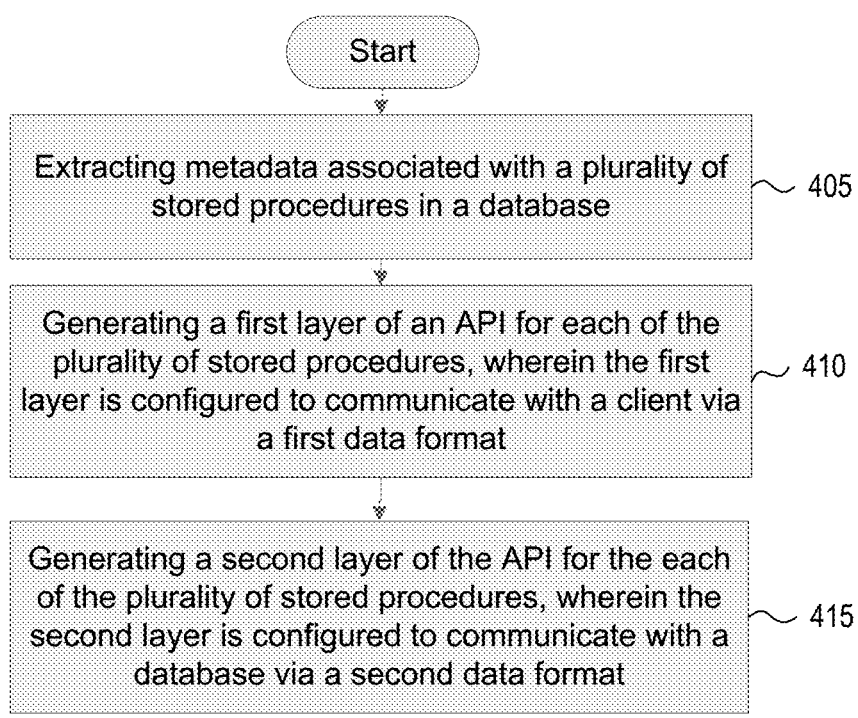
FIG. 4 depicts a flow chart for a method of dynamically generate an API according to one or more aspects of the disclosure.

FIG. 4 illustrates a flow chart for a method of using an API generator to dynamically generate an API in accordance with one or more aspects described herein. Method 400 may be implemented by a suitable computing system, as described further herein.

At step 405, an API generator may extract metadata associated with a plurality of stored procedures in the databases. The metadata may be related to stored procedure parameters in the databases. The databases may contain a collection of metadata information such as names of the stored procedures, the inputs and outputs of the stored procedures. The databases may contain stored procedure metadata tables that may provide the source code of the stored procedures storing each line of the source code of the stored procedures into a row in the tables. An API generator may query the stored procedure metadata tables in the underlying databases to extract the metadata.

At step 410, the API generator may generate a first layer or function of an API for each of the plurality of stored procedures, and the first layer or function of the API may be configured to communicate with a client via a first data format. The first layer of the API may be a controller layer and the first data format may be in a format or a language understandable by the enterprise applications, such as in Java. The controller layer may be a REST controller that provides a standard way to interact with the API, handles incoming HTTP requests, and send responses back to the enterprise applications in a data format understandable to enterprise applications. For example, the API generator may receive a name of the stored procedure from the enterprise application. The API generator may use the metadata extracted at step 405 as inputs, such as the stored procedure name, the corresponding stored procedure inputs and outputs in comma separated value (CSV) format extracted from metadata table of databases. The API generator may parse the CSV data, and use a template engine to generate a controller function definitions, such as function definitions for an API REST controller. The API generator may generate the output of the controller layer such as function definitions in the form of the generated library that includes input/output classes, and a reference to the REST controller. The generated API may use the generated input/output classes for reading/writing byte streams, reconstructing the application primitive data types and converting data from the application primitive data types associated with enterprise applications.

At step 415, the API generator may generate a second layer of the API for the each of the plurality of stored procedures, where the second layer may be configured to communicate with a database via a second data format. The second layer may be a DAO layer that communicates with the databases using database technologies such as SQL queries, Object-Relational Mapping (ORM) or stored procedures etc. in a data format understandable to databases 310. The DAO layer or function may receive the name and inputs/outputs of the stored procedure extracted at step 405, and generate the function definitions for the DAO layer. Through these definitions, the DAO layer may automatically generate appropriate queries such as in SQL commands, and cause the commands to be executed by the Data Base Management System (DBMS) of the database.

The DAO layer may contain API classes and input/output classes to facilitate communication with databases via the second data format. The DAO layer may serve as an abstract interface to the databases. By mapping application calls to the persistence layer, the DAO layer may provide some specific data operations without exposing details of the databases. Through the public interface of the DAO, the DAO layer may separate the application calling the stored procedures from the domain-specific objects and data types corresponding to the stored procedures, and from with the details how the stored procedures are executed by a specific DBMS, and database schema. As such, the DAO layer may decouple the enterprise applications from the underlying databases. Certain tasks such as initialization of data access object in the DAO layer, resource management, transaction management and exception handling may be the functions of the persistence framework.

In addition to the Controller layer and the DAO layer, the API generator may generate additional layers including a data structure layer and a service layer. The data structure layer may be a data structure interacting with the API and may include the request and response parameters of the API. For example, the API generator may generate a RESTful API and the RESTful API may use HTTP protocols as a medium of communication between a client (e.g. enterprise applications) and a server (e.g. the databases). A client may send a message in form of a HTTP Request and the server may respond in the form of an HTTP Response via HTTP messaging. These messages may contain message data and metadata related to the message data. The data structure layer may contain parameters associated with the HTTP Requests and HTTP Responses. The service layer may contain business logic and orchestrate data access and transformation. In some examples, the service layer may be merged with the DAO layer.

Although the API components are labelled as the first layer/function and the second layer/function for simplicity, the labels may not infer a sequence that the layers may be generated. It is possible, for example, that the second layer (DAO layer) may be generated before the first layer (controller layer), or the data structure layer may be generated first. The API generator may validate each layer of the API to eliminate errors and maintain integrity of each layer.

The API generator may dynamically generate a plurality of APIs associated with the plurality of stored procedures and segment the plurality of APIs to one or more domains. The domains may correspond to projects or business units within an enterprise organization. The API generator may determine an assigned domain for a specific stored procedure and retrieve the API associated with the stored procedure from the assigned domain.

The API generator may dynamically re-generate each layers of the API upon a schema change of the database. For example, after the schema change in the database, the metadata tables may be updated for certain stored procedures. The API generator may re-extract the metadata from the metadata tables, and re-generate the DAO layer of the API. The DAO layer may serve as an abstract interface to the databases, in terms of domain-specific objects and data types through the public interface of the DAO. Accordingly, the DAPO layer may decouple the enterprise applications from the underlying database schema changes.

Figure 5:
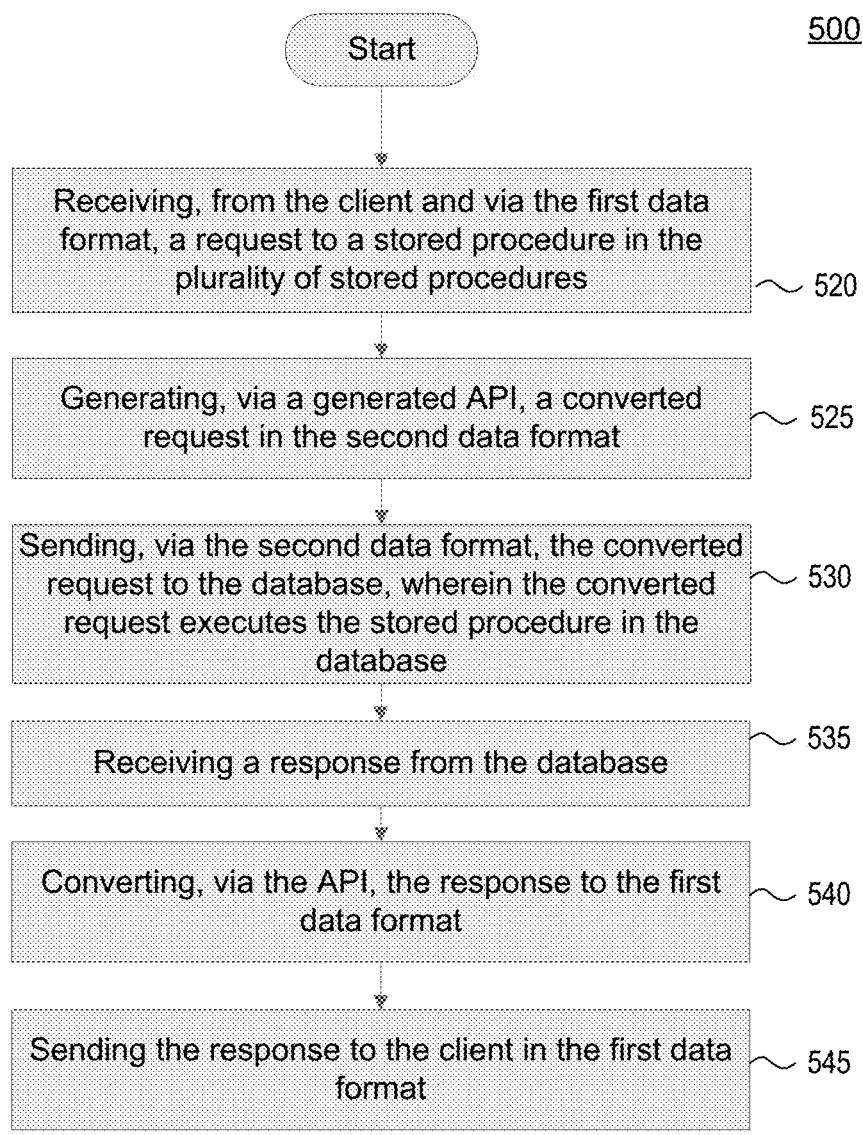
FIG. 5 depicts a flow chart for a method of using the pre-generated API to serve the client request according to one or more aspects of the disclosure.

FIG. 5 depicts a flow chart for a method of using pre-generated APIs to serve the client request according to one or more aspects of the disclosure. At step 520, a request may be received from a client to a stored procedure in the plurality of stored procedures via a first data format. For example, an enterprise application may call for a stored procedure in the underlying database. The API may be generated dynamically upon receiving the request invoking a stored procedure. The API generator may also dynamically generate a plurality of APIs prior to receiving the request for a particular stored procedure. A variety of processes for dynamically generating an API are described with respect to FIG. 4. The API generator may assign the generated APIs in various domains. The API generator may determine the assigned domain that is associated with the particular stored procedure and retrieve the API associated with the stored procedure from the domain. In either situation, the API generator may eliminate the need to manually generate an API for each stored procedure, which may be error-prone and time consuming. The request may be received from the enterprise applications in a first data format, and the request may be a HTTP request embedded in the Java codes. The request may be initially received by at the controller layer of API REST controller and the API REST controller may pass the request to the remaining layers of API for further processing.

At step 525, after the generated API receives the request, the generated API may convert the request from the first data format to a second data format. For example, an enterprise application may issue a HTTP request, invoking a stored procedure and the stored procedure may be associated with a create, read, update or delete (CRUD) operation. The API proxy may convert the CRUD operation as functional arguments in a common representational format, such as JSON or XML format. The API proxy may accept these arguments for the function call and provide these arguments to the SQL call in the function, which in turn may be converted to a corresponding SQL command to be executed to the underlying database.

For example, the HTTP request from the enterprise application may contain a POST command invoking a stored procedure for a "create" operation. The generated API may serve as a RESTful proxy to convert the "create" operation to a SQL "INSERT" command to the underlying database. A HTTP "GET" request invoking a stored procedure for a "read" or "retrieve" operation may be converted to a SQL "SELECT" command A HTTP "PUT" request invoking a stored procedure for a "update" or operation may be converted to a SQL "UPDATE" command. Likewise, A HTTP "DELETE" request invoking a stored procedure for a "delete" operation may be converted to a SQL "DELETE" command.

The API may perform the request conversions through the interactions of the controller layer, the DAO layer, the data structure layer and the service layer. For example, the HTTP "GET" request may be received by the controller layer of the API and the API may further contain a generated library that may include reference to generated REST controller and input/output classes. Through the interactions of generated API and generated library, the HTTP "GET" request may be converted to a "read" or "retrieve" operation in a representational format such as JSON or XML. The converted data in the JSON or XML format may be passed to the DAO layer for further processing. The DAO layer may use input/output classes to interpret the requested data in the representational format and convert the request into a corresponding second data format understandable to the databases, such as a SQL command to be executed by the DBMS of the underlying database. The data structure layer may provide the request parameters to facilitate the conversion process of the DAO layer.

At step 530, the generated API may send, via the second data format, the converted request to the database. The second data format may include a SQL command and the converted request may execute the stored procedure in the database based on the SQL command. The DAO layer may communicate with the databases using database technologies such as SQL queries, ORM and cause the stored procedure to be executed in the database. The DAO layer may contain API classes and input/output classes to facilitate communication with databases via the second data format. The DAO layer may serve as an abstract interface to the databases. By mapping the application calls to the persistence layer, the DAO layer may cause the execution of CRUD operations in the request without exposing details of the databases to the enterprise applications and decouple the enterprise applications from the underlying databases.

At step 535, in response to sending the converted request and causing the operations corresponding to the converted request, the generated API may receive a response from the database. The generated API may communicate with the database in a second data format and receive the response. The generated API may process the response and present the response in the presentational format such as JSON or XML.

At step 540, the generated API may convert the response to the first data format. The generated API may process the response in the common representational format, and generate corresponding arguments for the function call to the controller layer. The generated API may use the generated library to process the response and reconstruct the response to the application primitive data types associated with enterprise application in the first data format, such as Java. The generated API may also use the code snippets, which are a small region of re-usable codes operative to be incorporated into, for example, the Java codes of the enterprise application.

At step 545, the generated API may send the response to the client in the first data format. The generated API may send the converted response which may be the generated code snippets and plug them into the enterprise application. The generated API may send the converted response in the data format that is understandable to the enterprise application, such as Java. For example, the controller layer of the generated API may communicate with the enterprise application in the first data format and send the converted response to the enterprise application.

Figure 6:
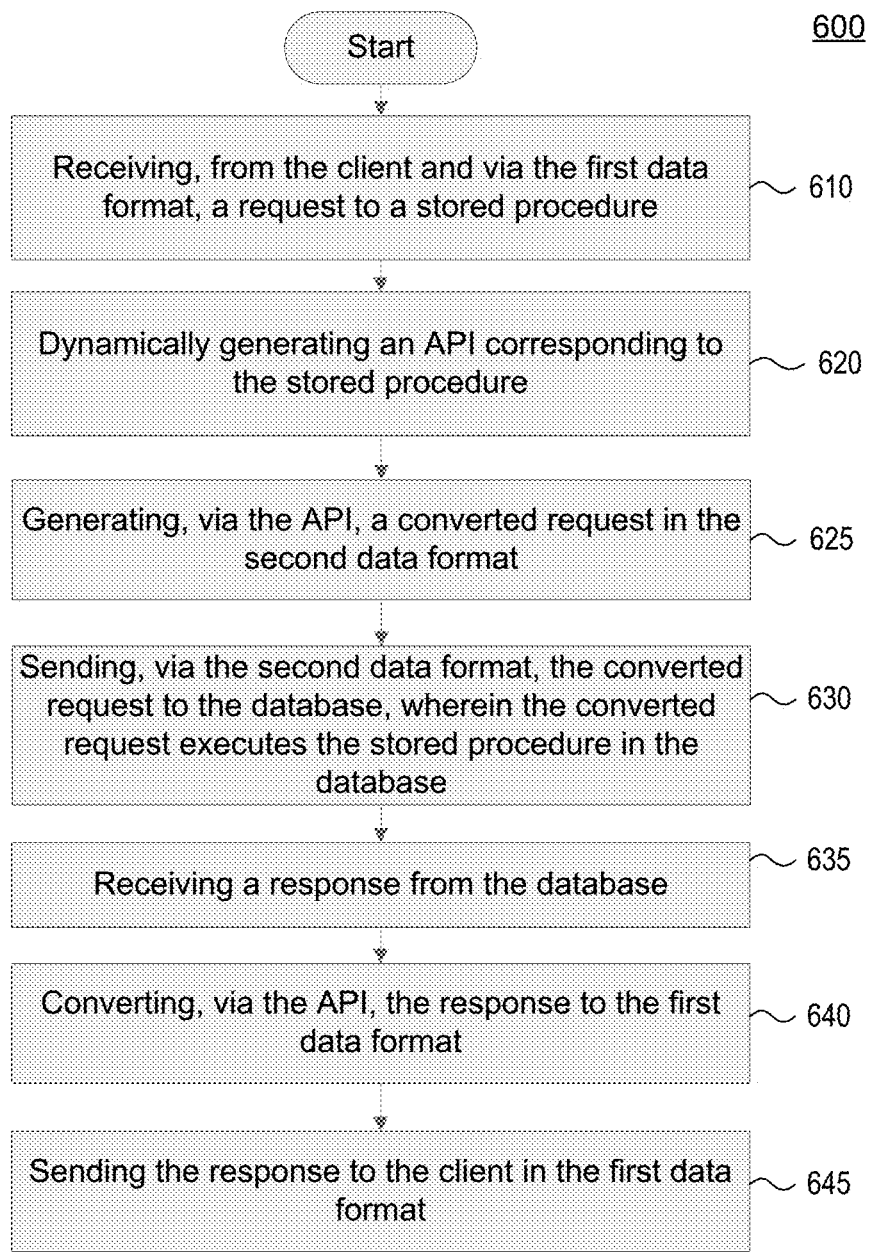
FIG. 6 depicts a flow chart for a method of dynamically generate an API to serve the client request according to one or more aspects of the disclosure.

FIG. 6 depicts a flow chart for a method of dynamically generating APIs to serve the client request according to one or more aspects of the disclosure. At step 610, a request to a stored procedure may be received from a client via a first data format. For example, the enterprise application may contain Java codes calling for a stored procedure to be executed on the underlying database. An API generator may receive a name and request parameters of the stored procedure.

At step 620, after receiving the request, the API generator may check whether there is a generated API corresponding to the stored procedure. If not, the API may be generated dynamically. A variety of processes for dynamically generating APIs are described with respect to FIG. 4. The API generator may extract the metadata from the database where the metadata may contain the source code, name, inputs/outputs of the stored procedure. Based on the metadata, the API generator may dynamically generate the various layers of the API that may server as an intermediate between the enterprise application and the database.

At step 625, the generated API may convert the request from the first data format to a second data format. The API may perform the request conversions through the interactions of the controller layer, the DAO layer, the data structure layer and the service layer. For example, the API may process the request from the enterprise application in the first data format via the controller layer. The API may generate a common representational format, for the request, in XML or JSON. The API may use the function definitions of the DAO layer and generate the appropriate arguments and request parameters for the function call to the DBMS of the underlying database.

At step 630, the generated API may send, via the second data format, the converted request to the database. For example, the DAO layer of the API may send the arguments and request parameters to the DBMS, which may cause the appropriate queries to be executed on the underlying database.

At step 635, in response to sending the converted request, the generated API may receive a response from the database. For example, the DAO layer of the API may receive a response from the DBMS. The generated API may process the response and present the response in the common representational format such as JSON or XML.

At step 640, the generated API may convert the response to the first data format. The generated API may process the response in the common representational format, and generate corresponding arguments for the function call to the controller layer. The generated API may use the generated library to process the response and reconstruct the response to the application primitive data types associated with enterprise application in the first data format, such as Java.

At step 645, the generated API may send the response to the client in the first data format. For example, the controller layer of the generated API may The API proxy may accept the arguments in the common representational format for the function call and provide these arguments to the enterprise application.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, and the like. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid-state memory, RAM, and the like. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a system, and/or a computer program product.

Although the present invention has been described in certain specific aspects, many additional modifications and variations would be apparent to those skilled in the art. In particular, any of the various processes described above may be performed in alternative sequences and/or in parallel (on different computing devices) in order to achieve similar results in a manner that is more appropriate to the requirements of a specific application. It is therefore to be understood that the present invention may be practiced otherwise than specifically described without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A computer-implemented method comprising:
   extracting metadata associated with a plurality of stored procedures in a database;
   generating a first layer of an application programming interface (API) for each of the plurality of stored procedures, wherein the first layer is configured to communicate with a client via a first data format;
   generating a second layer of the API for the each of the plurality of stored procedures, wherein the second layer is configured to communicate with the database via a second data format;
   receiving, from the client and via the first data format, a request to a stored procedure in the plurality of stored procedures;
   generating, via the API, a converted request in the second data format; and
   re-generating the first layer and the second layer of the API upon a schema change of the database.

2. The computer-implemented method of claim 1, further comprising:
   sending, via the second data format, the converted request to the database;
   in response to sending the converted request, receiving a response from the database, wherein the converted request executes the stored procedure in the database;
   converting, via the API, the response to the first data format; and
   sending the response to the client in the first data format.

3. The computer-implemented method of claim 1, further comprising:
   generating a plurality of APIs associated with the plurality of stored procedures;
   segmenting the plurality of APIs to one or more domains;
   determining an assigned domain for the stored procedure; and
   prior to receiving the request from the client, retrieving the API associated with the stored procedure from the assigned domain.

4. The computer-implemented method of claim 1, wherein the API comprises a representational state transfer (RESTful) API.

5. The computer-implemented method of claim 1, wherein generating the first layer of the API further comprises:
   generating a controller layer, wherein the controller layer communicates with the client in the first data format.

6. The computer-implemented method of claim 1, wherein generating the second layer of the API further comprises:
   generating a data access object (DAO) layer, wherein the DAO layer communicates with the database in the second data format.

7. The computer-implemented method of claim 1 further comprising:
   generating a data structure layer, wherein the data structure layer comprises request parameters and response parameters of the API.

8. The computer-implemented method of claim 1 further comprising:

generating a service layer, wherein the service layer contains business logic associated with data access and transformation.

9. The computer-implemented method of claim 1, wherein the metadata comprises a name, an input, and an output of the each of the plurality of the stored procedures.

10. The computer-implemented method of claim 1, further comprising:
prior to receiving the request to the stored procedure, validating the first layer and the second layer of the API.

11. A computing device comprising:
a database;
one or more processors; and
memory storing instructions that, when executed by the one or more processors, cause the computing device to:
extract metadata associated with a plurality of stored procedures in a database;
generate an API for each of the plurality of stored procedures by:
generating a controller layer, wherein the controller layer communicates with a client in a first data format; and
generating a DAO layer, wherein the DAO layer communicates with the database in a second data format;
receive, from the client and via the first data format, a request to a stored procedure in the plurality of stored procedures;
generate, via the API, a converted request in the second data format; and
re-generate the controller layer and the DAO layer of the API upon a schema change of the database.

12. The computing device of claim 11, wherein the instructions cause the computing device to:
send, via the second data format, the converted request to the database;
in response to sending the converted request, receive a response from the database, wherein the converted request executes the stored procedure in the database;
convert, via the API, the response to the first data format; and
send the response to the client in the first data format.

13. The computing device of claim 11, wherein the instructions cause the computing device to:
generate a plurality of APIs associated with the plurality of stored procedures;
segment the plurality of APIs to one or more domains;
determine an assigned domain for the stored procedure; and
prior to receiving the request from the client, retrieve the API associated with the stored procedure from the assigned domain.

14. The computing device of claim 11, wherein the API comprises a representational state transfer (RESTful) API.

15. The computing device of claim 11, wherein the instructions cause the computing device to: generate a data structure layer, wherein the data structure layer comprises request parameters and response parameters of the API.

16. The computing device of claim 11, wherein the instructions cause the computing device to: generate a service layer, wherein the service layer contains business logic associated with data access and transformation.

17. The computing device of claim 11, wherein the metadata comprises a name, an input, and an output of the each of the plurality of the stored procedures.

18. One or more non-transitory media storing instructions that, when executed by one or more processors, cause the one or more processors to perform steps comprising:
extracting metadata associated with a plurality of stored procedures in a database;
generating a first layer of an API for each of the plurality of stored procedures, wherein the first layer is configured to communicate with a client via a first data format;
generating a second layer of the API for the each of the plurality of stored procedures, wherein the second layer is configured to communicate with the database via a second data format;
receiving, from the client and via the first data format, a request to a stored procedure in the plurality of stored procedures;
generating, via the API, a converted request in the second data format;
sending, via the second data format, the converted request to the database;
in response to sending the converted request, receiving a response from the database, wherein the converted request executes the stored procedure in the database;
converting, via the API, the response to the first data format;
sending the response to the client in the first data format; and
re-generating the first layer and the second layer of the API upon a schema change of the database.

* * * * *